United States Patent
Nitta et al.

(10) Patent No.: US 9,314,775 B2
(45) Date of Patent: Apr. 19, 2016

(54) EXHAUST GAS PURIFYING CATALYST AND METHOD FOR PRODUCING SAME

(75) Inventors: Iwao Nitta, Susono (JP); Naotaka Sawada, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/372,344

(22) PCT Filed: Jun. 18, 2012

(86) PCT No.: PCT/JP2012/065528
§ 371 (c)(1),
(2), (4) Date: Jul. 15, 2014

(87) PCT Pub. No.: WO2013/108424
PCT Pub. Date: Jul. 25, 2013

(65) Prior Publication Data
US 2015/0005160 A1    Jan. 1, 2015

(30) Foreign Application Priority Data
Jan. 19, 2012   (JP) .................. 2012-009146

(51) Int. Cl.
*B01J 23/00* (2006.01)
*B01J 23/02* (2006.01)
(Continued)

(52) U.S. Cl.
CPC .............. *B01J 23/83* (2013.01); *B01D 53/944* (2013.01); *B01J 23/75* (2013.01); *B01J 23/78* (2013.01);
(Continued)

(58) Field of Classification Search
CPC .......... B01J 23/005; B01J 23/10; B01J 23/70; B01J 23/72; B01J 23/75; B01J 23/83
USPC ......... 502/304, 331, 332, 349–351, 439, 52.4
See application file for complete search history.

(56) References Cited

U.S. PATENT DOCUMENTS 5,047,378 A      9/1991   Kato et al.
7,465,495 B2 *  12/2008  Fujiyasu .............. C01G 51/006
                                                    148/251
(Continued)

FOREIGN PATENT DOCUMENTS

JP         2 107315       4/1990
JP         7 41313        2/1995
(Continued)

OTHER PUBLICATIONS

Reddy, B. M. et al., :Copper promoted ceria-zirconia based bimetallic catalysts for low temperature soot oxidation Catalysis Communications, vol. 10, pp. 1350-1353, 2009.
(Continued)

*Primary Examiner* — Cam N. Nguyen
(74) *Attorney, Agent, or Firm* — Oblon, McClelland, Maier & Neustadt, L.L.P.

(57) ABSTRACT

Provided is a non-noble metal-based exhaust gas purifying catalyst which is capable of removing an unreacted material such as carbon monoxide in an exhaust gas at low temperatures. An exhaust gas purifying catalyst of the present invention contains a ceria-based carrier and a complex oxide of cobalt and an additional metal element, said complex oxide being supported by the ceria carrier. The additional metal element contains a metal element that is selected from the group consisting of copper, silver, magnesium, nickel, zinc and combinations of these elements.

16 Claims, 5 Drawing Sheets

(51) Int. Cl.
  B01J 23/10    (2006.01)
  B01J 23/56    (2006.01)
  B01J 23/72    (2006.01)
  B01J 21/04    (2006.01)
  B01J 23/83    (2006.01)
  B01J 37/03    (2006.01)
  B01D 53/94    (2006.01)
  B01J 23/75    (2006.01)
  B01J 23/78    (2006.01)
  B01J 23/80    (2006.01)
  B01J 35/04    (2006.01)

(52) U.S. Cl.
  CPC  B01J 23/80 (2013.01); B01J 35/04 (2013.01); B01J 37/03 (2013.01); B01D 2255/104 (2013.01); B01D 2255/2047 (2013.01); B01D 2255/2065 (2013.01); B01D 2255/2092 (2013.01); B01D 2255/20746 (2013.01); B01D 2255/20753 (2013.01); B01D 2255/20761 (2013.01); B01D 2255/20792 (2013.01); B01D 2255/40 (2013.01); B01D 2255/405 (2013.01); B01D 2255/407 (2013.01)

(56) References Cited

U.S. PATENT DOCUMENTS

| | | | |
|---|---|---|---|
| 2008/0268382 A1* | 10/2008 | Tanaka | B82Y 30/00 430/324 |
| 2010/0273646 A1 | 10/2010 | Yasuda et al. | |

FOREIGN PATENT DOCUMENTS

| | | |
|---|---|---|
| JP | 7-41313 A | 2/1995 |
| JP | 9 122492 | 5/1997 |
| JP | 9-122492 A | 5/1997 |
| JP | 10 94731 | 4/1998 |
| JP | 2004 267872 | 9/2004 |
| JP | 2004-267872 A | 9/2004 |
| JP | 2006 159134 | 6/2006 |
| JP | 2006-159134 A | 6/2006 |
| JP | 2008 284535 | 11/2008 |
| JP | 2008-284535 A | 11/2008 |
| JP | 2010 104973 | 5/2010 |
| JP | 2010-125411 A | 6/2010 |
| JP | 2011 45840 | 3/2011 |
| JP | 2011-45840 A | 3/2011 |
| JP | 2011-46567 A | 3/2011 |
| WO | WO 2013/108424 A1 | 7/2013 |

OTHER PUBLICATIONS

Luo, M. et al., "Catalyst characterization and activity of Ag—Mn, Ag—Co and Ag—Ce composite oxide for oxidation of volatile organic compounds" Applied Catalyst A, General, vol. 175, pp. 121-129, 1998.

International Search Report Issued Aug. 7, 2012 in PCT/JP12/065528 Filed Jun. 18, 2012.

I. Spassova, et al., "Influence of Ce addition on the catalytic behavior of alumina-supported Cu—Co catalysts in NO reduction with CO" Journal of Colloid and Interface Science, vol. 354, No. 2, 2011, pp. 777-784.

* cited by examiner

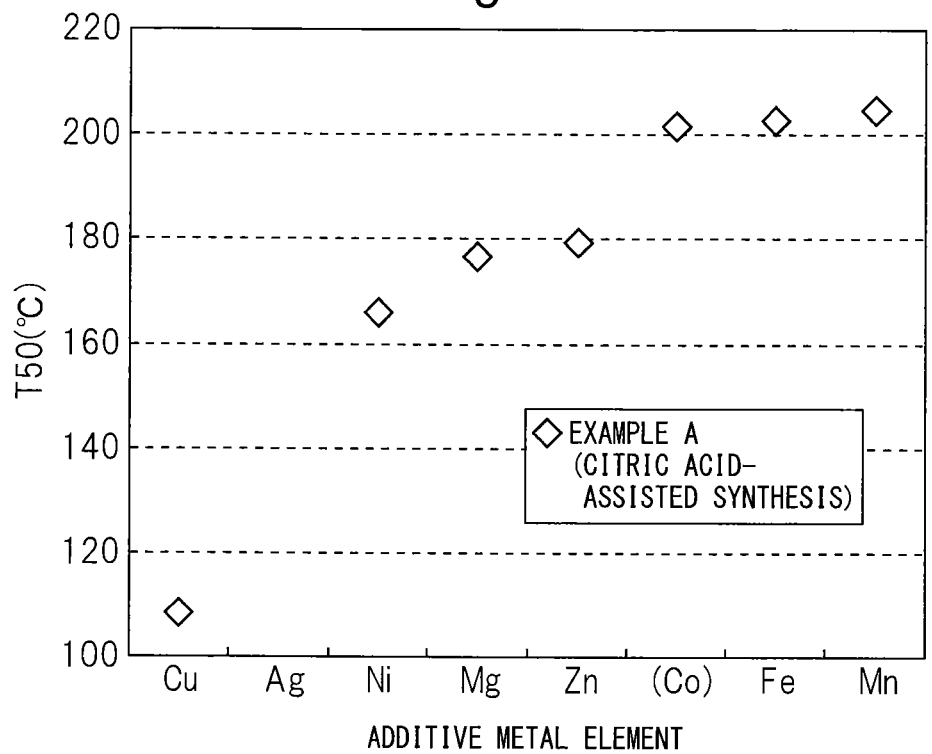
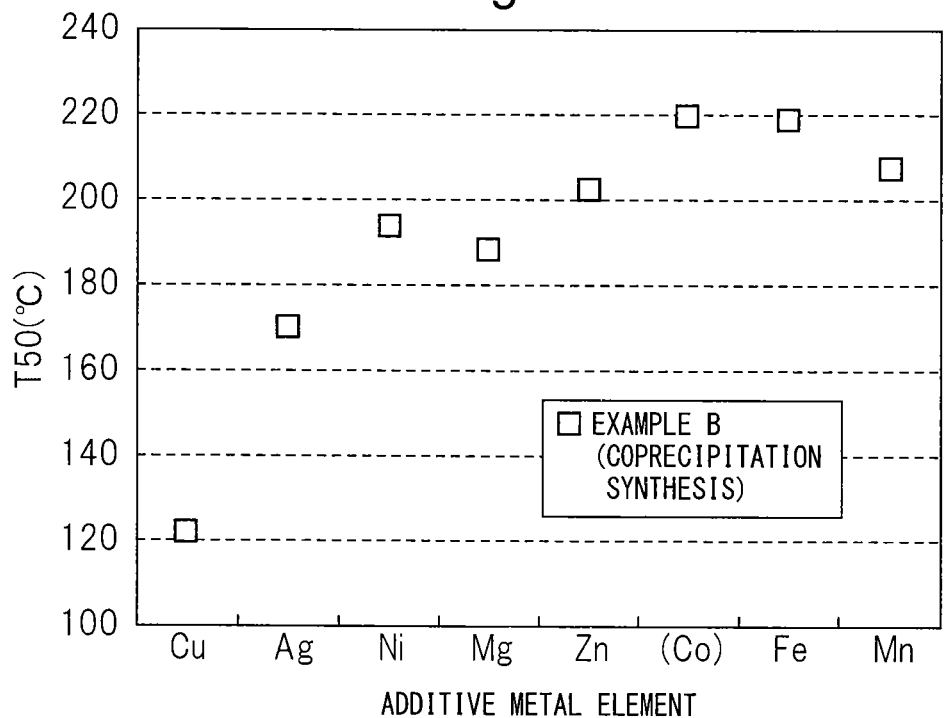

EXHAUST GAS PURIFYING CATALYST AND METHOD FOR PRODUCING SAME

TECHNICAL FIELD

The present invention relates to an exhaust gas purifying catalyst and a method for producing the same. More specifically, the present invention relates to a non-noble-based exhaust gas purifying catalyst capable of purifying an unreacted material such as carbon monoxide (CO) and hydrocarbon (HC) even at a low temperature, and a method for producing the same.

BACKGROUND ART

In an internal combustion engine, for example, in an automotive engine, a fuel such as gasoline and light gas oil may not be completely combusted under the insufficient warm-up condition at the time of engine startup or the like, and in turn, an unreacted material such as carbon monoxide and hydrocarbon is sometimes contained in the exhaust gas. An exhaust gas purifying catalyst for oxidizing carbon monoxide and the like contained in an exhaust gas and thereby purifying the same usually uses a noble metal as an essential component. However, from the resource standpoint, it is requested to use a non-noble-based exhaust gas purifying catalyst in place of such a noble metal-based catalyst.

As the non-noble metal-based exhaust gas purifying catalyst, a catalyst in which an oxide of non-noble metal such as cobalt oxide ($Co_3O_4$) is supported on a support is known, but this non-noble metal-based exhaust gas purifying catalyst does not satisfy the exhaust gas purification activity, and particularly the exhaust gas purification property at a low temperature, and therefore improvement thereof is required.

Also, with respect to the non-noble metal-based exhaust gas purifying catalyst, Patent Document 1 states that an exhaust gas purifying catalyst obtained by mixing zirconium oxide or titanium oxide having supported thereon copper (Cu) and/or cobalt (Co), and a copper-substituted zeolite, can remove nitrogen oxide and carbon monoxide in an exhaust gas. In Patent Document 1, a catalyst obtained by mixing a first component in which copper is supported on zirconia or titania, and a second component that is a copper-substituted zeolite, is described as a specific example.

Furthermore, Patent Document 2 states that an exhaust gas purifying catalyst in which silver (Ag) ion or its oxide and cobalt (Co) ion or its oxide are supported in a mordenite structure has a nitrogen oxide ($NO_x$) conversion property.

In addition, Patent Document 3 states that an exhaust gas catalyst containing a catalyst powder composed of an oxide of a transition metal element selected from the group consisting of manganese, iron, cobalt, nickel, and copper and an oxide of a rare earth element selected from the group consisting of cerium, praseodymium, neodymium, yttrium and scandium, can oxidize an unreacted material such as carbon monoxide and hydrocarbon and can reduce nitrogen oxide. In Patent Document 3, a purifying catalyst obtained by adding an aqueous sodium hydroxide solution to a mixed solution of an aqueous cobalt nitrate solution and an aqueous cerium nitrate solution to form a precipitate, and drying and firing the precipitate, is described as a specific example.

RELATED ART

Patent Document

Patent Document 1: JP-H2-107315
Patent Document 2: JP-H10-94731
Patent Document 3: JP-2010-104973

SUMMARY OF THE INVENTION

Problems to be Solved by the Invention

As described above, in prior art, various studies have been made on an exhaust gas purifying catalyst not using a noble metal.

However, it is difficult for the non-noble metal-based exhaust gas purification proposed in prior art to sufficiently oxidize and purify carbon monoxide and the like in an exhaust gas at a low temperature.

Accordingly, an object of the present invention is to provide a non-noble metal-based exhaust gas purifying catalyst capable of oxidizing carbon monoxide and the like in an exhaust gas at a low temperature, and a method for producing the same.

Means to Solve the Problems

<1> An exhaust gas purifying catalyst comprising
a ceria-based support, and
a composite oxide of cobalt and an additive metal element, supported on the ceria-based support,
wherein
the additive metal element comprises a metal element selected from the group consisting of copper, silver, magnesium, nickel, zinc, and a combination thereof.

<2> The exhaust gas purifying catalyst according to <1> above, wherein the additive metal element comprises copper.

<3> The exhaust gas purifying catalyst according to <1> or <2> above, wherein the ceria-based support is selected from the group consisting of ceria particles, ceria-zirconia composite oxide particles, ceria-alumina composite oxide particles, ceria-titania composite oxide particles, ceria-silica composite oxide particles, and ceria-zirconia-alumina composite oxide particles.

<4> The exhaust gas purifying catalyst according to any one of <1> to <3> above, wherein the molar ratio (Co:M) between cobalt (Co) and additive metal element (M) in the composite oxide is 1:0.1 to 1.0.

<5> The exhaust gas purifying catalyst according to any one of <1> to <4> above, wherein the metal-based supporting amount of cobalt is from 1 to 20 mass % relative to the ceria-based support.

<6> The exhaust gas purifying catalyst according to any one of <1> to <5> above,
wherein the composite oxide has a spinel structure, and
wherein, when the composite oxide is analyzed by Rietveld analysis, compared with cobalt oxide not containing the additive metal element, the $M_{TET}$-O bond distance in the spinel structure of the composite oxide is extended by 0.01 Å or more, and/or the $M_{OCT}$-O bond distance in the spinel structure of the composite oxide is contracted by 0.01 Å or more.

<7> The exhaust gas purifying catalyst according to <6> above,
wherein the composite oxide has a spinel structure, and
wherein, when the composite oxide is analyzed by Rietveld analysis, compared with cobalt oxide not containing the additive metal element, the $M_{TET}$-O bond distance in the spinel structure of the composite oxide is extended by 0.01 Å or more.

<8> The exhaust gas purifying catalyst according to <6> or <7> above,
wherein the composite oxide has a spinel structure, and wherein, when the composite oxide is analyzed by Rietveld analysis, compared with cobalt oxide not containing the additive metal element, the $M_{OCT}$-O bond distance in the spinel structure of the composite oxide is contracted by 0.01 Å or more.

<9> The exhaust gas purifying catalyst according to <1> above, wherein a cobalt-copper composite oxide is supported on the ceria-based support, and the metal-based supporting amount of copper is from 2 to 3 mass % relative to the ceria-based support.

<10> The exhaust gas purifying catalyst according to <1> above, wherein a cobalt-copper composite oxide is supported on the ceria-based support, the cobalt-copper composite oxide comprises cobalt oxide particles having an average particle diameter of 20 to 100 nm, copper oxide particles having an average particle diameter of 2 to 10 nm are supported in a dispersed manner on the cobalt oxide particles, and copper at least partially solid-dissolved in the cobalt oxide particles.

<11> A method for producing the exhaust gas purifying catalyst according to any one of <1> to <10> above,
wherein the method comprises the following steps:
providing a raw material solution containing a cobalt salt, a salt of the additive metal element, and a complexing agent, and
impregnating the ceria-based support with the raw material solution, followed by drying and firing,
wherein the complexing agent is an organic acid having at least one hydroxyl group and at least one carboxyl group.

<12> The method according to <11> above, wherein the raw material solution further contains a polyhydric alcohol (e.g., ethylene glycol), and the raw material solution is heated after impregnating the ceria-based support with the raw material solution but before performing drying and firing.

<13> A method for producing the exhaust gas purifying catalyst according to any one of <1> to <10> above,
wherein the method comprises the following steps:
providing a raw material solution containing a cobalt salt and a salt of the additive metal element,
adding a neutralizer to the raw material solution to precipitate a precursor of the composite oxide, and thereby make a slurry of the precursor,
impregnating the ceria-based support with the slurry, and
drying and firing the ceria-based support impregnated with the slurry.

<14> A method for producing the exhaust gas purifying catalyst according to any one of <1> to <10> above,
wherein the method comprises the following steps:
preparing a cobalt salt and a copper salt at such a ratio that the metal-based supporting amount of copper is 2 to 3 mass % relative to the ceria-based support,
applying a shear stress by super agitation to a mixed solution of the cobalt salt, the copper salt and a neutralizer, to agitate the mixed solution and precipitate a cobalt-copper composite oxide precursor, and thereby making a slurry of the precursor,
mixing the slurry and a ceria-based support powder, and
separating a solid mixture of the solid precursor and the ceria-based support powder from the obtained mixture, followed by drying and firing the mixture.

<15> The production method according to <14> above, wherein the cobalt salt is used in such a ratio that the metal-based supporting amount of cobalt is 5 mass % relative to the ceria-based support.

<16> The production method according to <14> or <15> above, wherein the neutralizer is an inorganic basic compound or an organic basic compound.

<17> The production method according to any one of <14> to <16> above, wherein the shear stress by super agitation is applied in a reaction vessel by an agitator rotating at a rotation speed of 5,000 to 15,000 rpm.

<18> The production method according to any one of <14> to <17> above, wherein the mixed solution is an aqueous solution.

Effects of the Invention

According to the exhaust gas purifying catalyst of the present invention, carbon monoxide and the like can be oxidized and purified even at a low temperature.

BRIEF DESCRIPTION OF THE DRAWINGS

FIG. 1 is a graph showing the relationship between the type of additive metal element and the exhaust gas purification property, in regard to the exhaust gas purifying catalyst produced in Example A.

FIG. 2 is a graph showing the relationship between the type of additive metal element and the exhaust gas purification property, in regard to the exhaust gas purifying catalyst produced in Example B.

MODE FOR CARRYING OUT THE INVENTION

Exhaust Gas Purifying Catalyst

The exhaust gas purifying catalyst of the present invention has a ceria-based support, and a composite oxide of cobalt and an additive metal element, supported on the ceria-based support, and the additive metal element comprises a metal element selected from the group consisting of copper, silver, magnesium, nickel, zinc, and a combination thereof, preferably comprises copper.

<Composite Oxide>

As regards the present invention, the "composite oxide" means a material in which at least two kinds of metal oxides at least partially form a solid solution together. Accordingly, for example, a composite oxide of cobalt and an additive metal element means a material in which cobalt oxide and an oxide of additive metal element at least partially form a solid solution, and particularly a material in which cobalt and an additive metal element at least partially form an oxide having a single crystal structure, e.g. a spinel composite oxide. That is, for example, when the additive metal element is copper, the "composite oxide" may have not only a portion where cobalt oxide and an oxide of additive metal element form a solid solution, but also a portion where each of cobalt oxide and an oxide of additive metal oxide is present by itself.

The exhaust gas purifying catalyst of the present invention using cobalt and copper was analyzed by scanning transmission electron microscopy-energy dispersive X-ray spectroscopy (STEM-EDX analysis), as a result, it was confirmed that a cobalt-copper composite oxide is present, i.e., that cobalt oxide and copper oxide at least partially form a solid solution.

Figure 4:
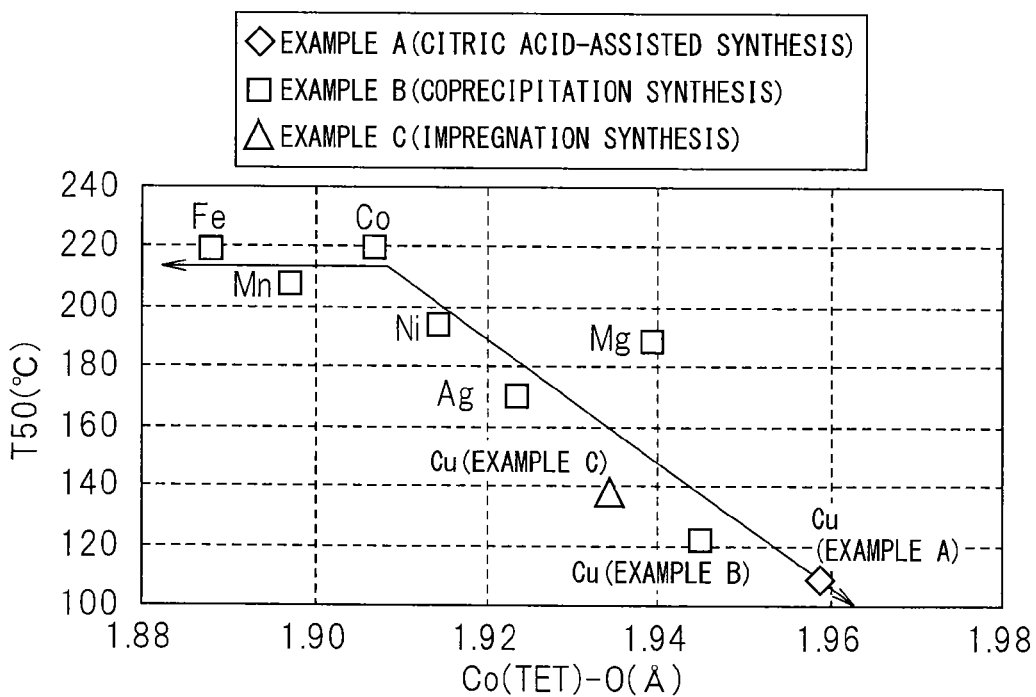
FIG. 4 is a graph showing the relationship between the $M_{TET}$-O bond distance in a spinel composite oxide and the exhaust gas purification property, in regard to the exhaust gas purifying catalysts produced in Examples A, B and C.
Figure 5:
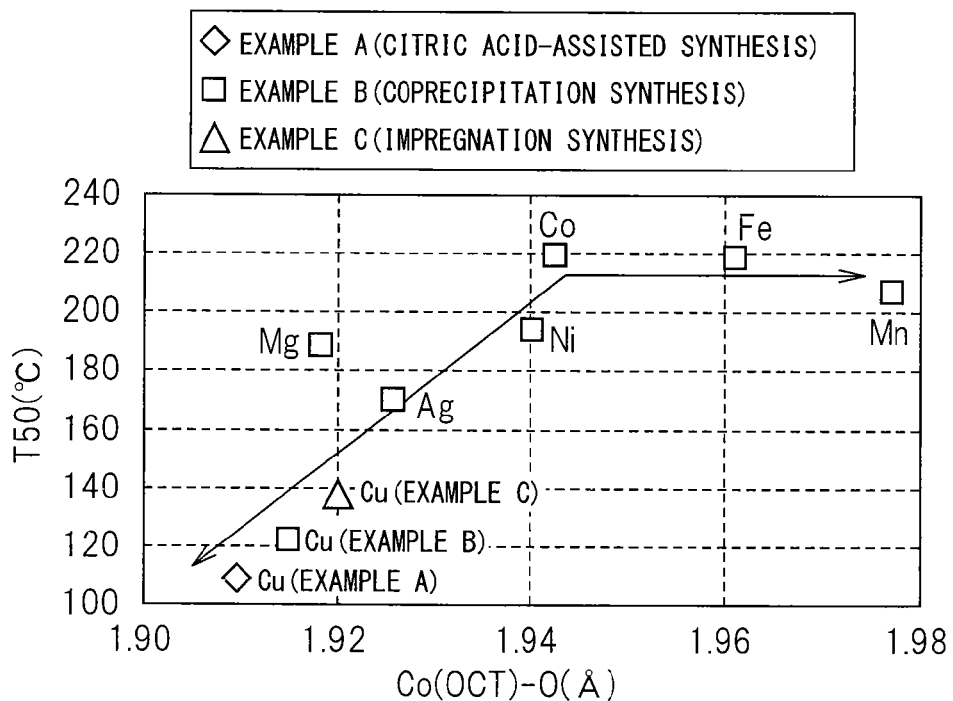
FIG. 5 is a graph showing the relationship between the $M_{OCT}$-O bond distance in a spinel composite oxide and the exhaust gas purification property, in regard to the exhaust gas purifying catalysts produced in Examples A, B and C.

Also, it was confirmed that as shown in FIGS. 4 and 5 regarding Examples A to C below, the carbon monoxide conversion property of a cobalt-containing spinel composite oxide has an apparent correlation with the $M_{TET}$-O bond distance and $M_{OCT}$-O bond distance of the composite oxide. Specifically, it was found that, when compared with cobalt oxide not containing an additive metal element, the $M_{TET}$-O bond of the composite oxide is extended, and the $M_{OCT}$-O bond distance of the composite oxide is contracted, the oxidation property for carbon monoxide and the like is improved.

Accordingly, although not wishing to be bound by any theory, it is believed that the carbon monoxide conversion capacity at low temperature of the exhaust gas purifying catalyst of the present invention is attributable to the fact that, compared with spinel-type cobalt oxide not containing an additive metal element, the length of metal-oxygen bond is changed, and thereby an active site providing oxygen to carbon monoxide or the like is created.

Specifically, in the exhaust gas purifying catalyst of the present invention, when a spinel composite oxide is analyzed by Rietveld analysis for the metal-oxygen bond distance in the composite oxide, compared with cobalt oxide not containing the additive metal element, the $M_{TET}$-O bond distance in the spinel structure of the composite oxide may be extended by 0.01 Å or more, 0.02 Å or more, 0.03 Å or more, 0.04 Å or more, or 0.05 Å or more. Also, this extension may be, for example, 0.15 Å or less, 0.10 Å or less, 0.09 Å or less, 0.08 Å or less, 0.07 Å or less, or 0.06 Å or less.

Specifically, in the exhaust gas purifying catalyst of the present invention, when a spinel composite oxide is analyzed by Rietveld analysis for the metal-oxygen bond distance in the composite oxide, compared with cobalt oxide not containing the additive metal element, the $M_{OCT}$-O bond distance in the spinel structure of the composite oxide may be contracted by 0.01 Å or more, 0.02 Å or more, or 0.03 Å or more. Also, the contraction may be 0.10 Å or less, 0.09 Å or less, 0.08 Å or less, 0.07 Å or less, 0.06 Å or less, or 0.05 Å or less.

Figure 9:
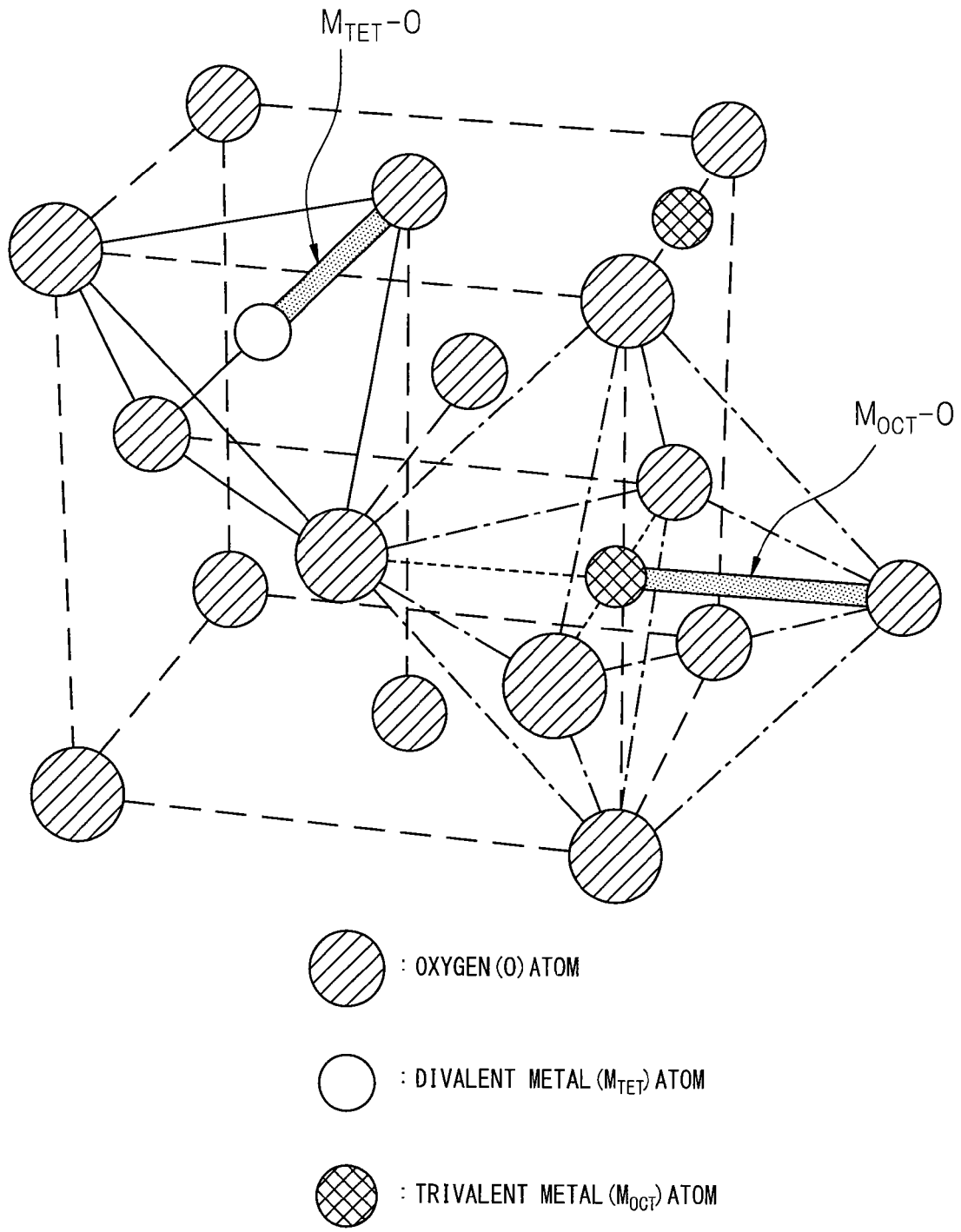
FIG. 9 is a view for explaining the positions of $M_{TET}$-O bond and $M_{OCT}$-O bond in a spinel composite oxide.

Incidentally, the "$M_{TET}$-O bond distance in the spinel structure" means, as shown in FIG. 9, the bond distance between the metal element ($M^{2+}$) at the center position of oxygen tetrahedral and the coordinate oxygen ($O^{2-}$). On the other hand, the "$M_{OCT}$-O bond distance in the spinel structure" means, as shown in FIG. 9, the bond distance between the metal element ($M^{3+}$) at the center position of oxygen octahedral and the coordinate oxygen ($O^{2-}$).

In the Rietveld analysis, the X-ray diffraction intensity data measured and the spinel crystal structure models are adopted as input values, and the computation is refined to conform the calculated diffraction intensity to the measured diffraction intensity as much as possible by moving the lattice constant, fractional atomic coordinate, atomic occupancy at each site, and structural parameter such as atomic displacement parameter. Also, the parameters derived from the methods for measuring the background, zero point shift, sample displacement parameter, sample permeation parameter, surface roughness parameter, parameter related to symmetry of profile, etc., and the parameters derived from the sample condition or apparatus, are refined.

In the exhaust gas purifying catalyst of the present invention, cobalt and the additive metal element may be used in any ratio in the composite oxide. However, the cobalt and additive metal element are preferably used in the range causing the obtained composite oxide to readily form a spinel structure, and for example, may be used such that the molar ratio (Co: M) between cobalt (Co) and additive metal element (M) in the composite oxide is 1:0.1 to 1.0, 1:0.3 to 0.8, 1:0.4 to 0.7, 1:0.4 to 0.6, or about 2:1.

In the exhaust gas purifying catalyst of the present invention, a composite oxide of cobalt and an additive metal element can be supported on a ceria-based support as long as the effects of the exhaust gas purifying catalyst of the present invention are obtained. Accordingly, for example, the composite oxide of cobalt and an additive metal element can be used such that the metal-based supporting amount of cobalt is 1 mass % or more, 2 mass % or more, 3 mass % or more, or 4 mass % or more, and/or 20 mass % or less, 15 mass % or less, or 10 mass % or less, relative to the ceria-based support.

In one embodiment of the exhaust gas purifying catalyst of the present invention, a cobalt-copper composite oxide is supported on a ceria-based support, and the metal-based supporting amount of copper is from 2 to 3 mass %, relative to the ceria-based support.

In another embodiment of the exhaust gas purifying catalyst of the present invention, a cobalt-copper composite oxide is supported on a ceria-based support, the cobalt-copper composite oxide comprises cobalt oxide particles having an average particle diameter of 20 to 100 nm, copper oxide particles having an average particle diameter of 2 to 10 nm are supported in a dispersed manner on the cobalt oxide particles, and copper at least partially solid-dissolved in the cobalt oxide particles.

<Ceria-Based Support>

As described in relation to Example D below, the composite oxide of cobalt and copper or the like exhibits preferable properties particularly when supported on a ceria-based support serving as a support. Therefore, it is considered that the oxygen storage capacity (OSC capacity) of ceria promotes the above-described property of donating oxygen to carbon monoxide and the like.

The ceria-based support that can be used in the exhaust gas purifying catalyst of the present invention is ceria-containing support particles, and particularly composite oxide support particles of ceria and the other metal. Specifically, the ceria-based support usable in the exhaust gas purifying catalyst of the present invention may be selected from the group consisting of ceria particles, ceria-zirconia composite oxide particles, ceria-alumina composite oxide particles, ceria-titania composite oxide particles, ceria-silica composite oxide particles, and ceria-zirconia-alumina composite oxide particles.

<Production Method>

The exhaust gas purifying catalyst of the present invention can be produced by any method such as impregnation method, coprecipitation method and sol-gel method, and particularly by the following method of the present invention.

<<Production Method 1 of Exhaust Gas Purifying Catalyst—Citric Acid-Assisted Synthesis Method>>

The first method of the present invention for producing the exhaust gas purifying catalyst includes the following steps, and the complexing agent below is an organic acid having at least one hydroxyl group and at least one carboxyl group:

providing a raw material solution containing a cobalt salt, a salt of the additive metal element, and a complexing agent, and impregnating a ceria-based support with the raw material solution, followed by drying and firing.

According this method of the present invention, i.e. according to the method of the present invention using a citric acid-assisted synthesis method of a composite oxide, a cobalt ion and an ion of the additive metal element are complexed by the complexing agent, whereby formation of a uniform composite oxide, i.e., formation of a solid solution of cobalt and the additive metal element, can be promoted even at a relatively low firing temperature. This method can be performed, for example, such that the total concentration of cobalt ion and additive metal element ion in the raw material solution is from 0.01 to 0.2 M.

The complexing agent which can be used in the method above, i.e., the organic acid having at least one hydroxyl group and at least one carboxyl group includes malic acid, tartaric acid, citric acid, and glycolic acid. The complexing agent may be used, for example, in an amount of 1 to 10 times, or from 1 to 5 times of the total of cobalt ion and additive metal element ion, in terms of molar ratio.

Also, in this method, the raw material solution may further contain a polyhydric alcohol, e.g. ethylene glycol, and the raw material solution can be heated after impregnating the ceria-based support with the raw material solution but before performing the drying and firing. The heating may be performed, for example, at a temperature of 100 to 160° C.

According to this, by the ester polymerization of the complex of cobalt and additive metal element with the polyhydric alcohol, the complex of cobalt and additive metal element may be gelled to promote formation of a uniform composite oxide.

As for the cobalt salt, the salt of additive metal element, the solvent of raw material solution, the reaction vessel, drying and firing conditions, etc., the following description relating to the second method of the present invention for producing the exhaust gas purifying catalyst may be referred to.

<<Production Method 2 of Exhaust Gas Purifying Catalyst—Coprecipitation Synthesis Method>>

The second method of the present invention for producing the exhaust gas purifying catalyst includes the following steps:

providing a raw material solution containing a cobalt salt and a salt of the additive metal element, adding a neutralizer to the raw material solution to precipitate a precursor of a composite oxide, and thereby make a slurry of the precursor, impregnating the ceria-based support with the slurry, and drying and firing the ceria-based support impregnated with the slurry.

According to this method of the present invention, i.e., according to the method using a coprecipitation synthesis method of a composite oxide, formation of a uniform composite oxide can be promoted.

The cobalt salt includes a nitrate, a sulfate, an acetate, etc. of cobalt. Also, the salt of the additive metal element includes a nitrate, a sulfate, an acetate, etc. of the additive metal element, and particularly a nitrate, a sulfate, an acetate, etc. of copper.

The neutralizer includes, for example, an inorganic basic compound such as ammonia ($NH_3$), sodium carbonate ($Na_2CO_3$), sodium hydroxide (NaOH) and potassium hydroxide (KOH). Also, the neutralizer includes, for example, organic basic compounds such as pyridine and a (poly)ethylenediamine compound, the (poly)ethylenediamine compound being preferred.

The (poly)ethylenediamine compound as a preferable neutralizer include those having 1 to 10 ethylene units, and particularly those having 1 to 6 ethylene units. Specifically, preferable polyethylenediamine compounds include ethylenediamine (EDA: $H_2NCH_2CH_2NH_2$), diethylenetriamine (DETA: $H_2NCH_2CH_2NHCH_2CH_2NH_2$), triethylenetetramine (TETA: $H_2NCH_2CH_2NHCH_2CH_2NHCH_2CH_2NH_2$), tetraethylenepentamine [TEPA: $H_2N(CH_2CH_2NH)_3CH_2CH_2NH_2$], and pentaethylenehexamine [PEHA: $H_2N(CH_2CH_2NH)_4H_2CH_2NH_2$], theethylenediamine (DDA) being preferred.

The solvent of the raw material solution includes an alcohol such as methanol, ethanol and isopropanol, and water, the water being preferred.

In the step of adding a neutralizer to precipitate a precursor of the composite oxide, the pH of the aqueous solution is preferably adjusted to a range 6 to 9. In this connection, if the pH is too low, a precipitation reaction between cobalt and the additive metal element may not occur, whereas if the pH is too high, the precursor precipitated may dissolve.

The raw material solution may further contain a dispersant, for example, sodium pyrrolidonecarboxylate (PAA-Na) or polyvinylpyrrolidone (PVP).

The drying and firing may be performed under any conditions where the exhaust gas purifying catalyst can be obtained. For example, the drying may be performed at a temperature of 50 to 200° C. in air, and the firing may be performed at a temperature of 300° C. or more, or 600° C. or more, and less than 800° C., or 700° C. or less, over 1 to 10 hours, or over 2 to 8 hours.

The reaction vessel for carrying out this method is not particularly limited, and a batch reaction apparatus or a continuous reaction apparatus may be used.

<<Production Method 2 of Exhaust Gas Purifying Catalyst—Coprecipitation Synthesis Method (Super Agitation)>>

The second method of the present invention for producing the exhaust gas purifying catalyst includes, for example, the following steps:

providing a cobalt salt and a copper salt at such a ratio that the metal-based supporting amount of copper is 2 to 3 mass % relative to the ceria-based support, applying a shear stress by super agitation to a mixed solution of the cobalt salt, the copper salt and a neutralizer to agitate the mixed solution and precipitate a cobalt-copper composite oxide precursor, and thereby making a slurry of the precursor, mixing the slurry and a ceria-based support powder, and separating a solid mixture of the solid precursor and the ceria-based support powder from the obtained mixture, followed by drying and firing the mixture.

According to this method of the present invention, i.e. according to the method comprising applying a shear stress by super agitation to a mixed solution of the cobalt salt, the copper salt and a neutralizer, formation of a uniform composite oxide can be promoted.

On the other hand, by physically mixing of cobalt oxide and copper oxide, each of cobalt oxide and copper oxide is aggregated to form coarse secondary particles, and thereby the carbon monoxide oxidation activity is reduced. In the method of the present invention employing super agitation for a coprecipitation reaction, formation of a uniform composite oxide is considered to be promoted even compared with a coprecipitation synthesis method not employing super agitation.

As regards the present invention, the super agitation means agitation providing a large shear force, for example, agitation at a rotation speed of 5,000 to 15,000 rpm, and particularly agitation at a rotation speed of 8,000 to 12,000 rpm.

In this connection, if the rotation speed of agitation is too low, a uniform precursor (precipitate) may not be obtained because the mixed solution may not be sufficiently agitated. On the other hand, if the rotation speed is too high, a uniform precursor (precipitate) may not be obtained because the shaft of the agitator generates heat and the solubility of the precursor is changed.

Incidentally, in this method of the present invention, the slurry may be produced by precipitating a precursor of the composite oxide, adding pure water to the precursor, subjecting the resulting precursor solution to centrifugal separation or filtration and then to washing, and if desired, adding water to the slurry.

<Use of Exhaust Gas Purifying Catalyst>

The exhaust gas purifying catalyst of the present invention can be used as an exhaust gas purifying catalyst for purifying an exhaust gas from an internal combustion engine such as automotive engine.

Also, the exhaust gas purifying catalyst of the present invention may be used in any field requiring low-temperature purification of carbon monoxide and/or hydrocarbon.

Furthermore, in the case of removing carbon monoxide and hydrocarbon by using the exhaust gas purifying catalyst of the present invention, at least two regions differing in the temperature may be provided. For example, the temperature in the region for carbon monoxide purification may be set to be lower than the temperature in the region for carbon monoxide purification.

In addition, the exhaust gas purifying catalyst of the present invention may be coated on a general substrate such as a honeycomb substrate to be used as a catalyst device.

The honeycomb substrate that can be used may be made of a ceramic material such as cordierite, or a metal material such as stainless steel. Also, the exhaust gas purifying catalyst of the present invention may be used by forming it into any shape, e.g. by forming it into a pellet shape.

EXAMPLES

The present invention is described below with referring to Examples, but the present invention is not limited to these Examples.

Examples A to C

In Examples A to C, a composite oxide of cobalt and an additive metal element was supported on a ceria-based support, and the effect of the type of the additive metal element on the property of the exhaust gas purifying catalyst was examined. In Examples A to C, the effect of the method by which the composite oxide is synthesized and supported, on the property of the exhaust gas purifying catalyst was also examined.

Example A

Production of Exhaust Gas Purifying Catalyst by Citric Acid-Assisted Synthesis Method In Example A, for the production of an exhaust gas purifying catalyst where a composite oxide of cobalt and an additive metal element is supported on a ceria-based support, the composite oxide was obtained by the citric acid-assisted synthesis method using any one of copper (Cu), nickel (Ni), magnesium (Mg), zinc (Zn), iron (Fe) and manganese (Mn) as the additive metal element. Also, for comparison, cobalt oxide was obtained by the citric acid-assisted synthesis method using cobalt in place of the additive element, i.e., by using only cobalt as the raw material of the metal oxide.

Accordingly, in Example A, as shown in Table 1 below, exhaust gas purifying catalysts having 7 kinds of catalyst configurations were obtained. Specifically, in Example A, the exhaust gas purifying catalyst was produced as follows.

1. Preparation of Metal Salt Solution

Cobalt nitrate and a nitrate salt of the additive metal element were dissolved in pure water such that the molar ratio (Co:M) of cobalt (Co) and the additive metal element (M) became 1:0.5, and the solution was thoroughly stirred and mixed to obtain a metal salt solution.

2. Preparation of Complexing Agent Solution

Citric acid (CA) as a complexing agent and ethylene glycol (EG) as an esterifying agent were added to pure water such that the molar ratio (Co+M:CA:EG) of the total of cobalt (Co) and additive metal element (M) of the metal salt solution to citric acid (CA) and ethylene glycol (EG) is 1:3:3, and the solution was thoroughly stirred and mixed to obtain a complexing agent solution.

3. Synthesis and Loading of Composite Oxide

The metal salt solution and the complexing agent solution were thoroughly stirred at room temperature to obtain a raw material mixed solution. To this raw material mixed solution, a ceria-zirconia composite oxide ($CeO_2$—$ZrO_2$) support powder (ACTALYSLISA, produced by CATALER Corporation) as a support was added in such an amount that the metal-based supporting amount of cobalt is 5 mass % relative to the support powder. The resulted solution was thoroughly stirred at room temperature, refluxed in an evaporator under reduced pressure at 70° C. over 2 hours, and heated at 140° C. over 4 hours to obtain a gel-like precursor product.

4. Drying and Firing

The obtained gel-like precursor product was stepwise heated to 400° C. over 9 hours in an electric furnace and thereafter fired at 600° C. over 4 hours in a firing furnace to obtain a catalyst powder.

5. Pelletization

The obtained catalyst powder was formed into a pellet shape by a cold isotropic press (CIP) at a pressure of 1 ton to obtain the exhaust gas purifying catalyst of Example A. Incidentally, individual pellets had a volume of 0.17 $cm^3$.

Example B

Production of Exhaust Gas Purifying Catalyst by Coprecipitation Synthesis Method In Example B, for the production of an exhaust gas purifying catalyst where a composite oxide of cobalt and an additive metal element is supported on a ceria-based support, the composite oxide was obtained by the coprecipitation synthesis method using any one of copper, silver, nickel, magnesium, zinc, iron and manganese as the additive metal element. Also, for comparison, cobalt oxide was obtained by the coprecipitation synthesis method using cobalt in place of the additive element, i.e., by using only cobalt as the raw material of the metal oxide.

Accordingly, in Example B, as shown in Table 1 below, exhaust gas purifying catalysts having 8 kinds of catalyst configurations were obtained. Specifically, in Example B, the exhaust gas purifying catalyst was produced as follows.

1. Synthesis of Composite Oxide

In Example B, a sodium hydroxide solution was added by means of a pipette to a metal salt solution obtained as in Example A until the pH of the metal salt solution became 9, whereby a precursor of a composite oxide of cobalt and the additive metal element was precipitated to obtain a slurry. The obtained slurry was water-washed by filtration to obtain a slurry containing the composite oxide precursor.

2. Loading of Composite Oxide

The same support powder as used in Example A was impregnated with the slurry containing the composite oxide precursor, dried at 120° C. and fired at 600° C. to obtain a catalyst powder.

3. Pelletization

The obtained catalyst powder was formed into a pellet shape in the same manner as in Example A to obtain the exhaust gas purifying catalyst of Example B.

Example C

Production of Exhaust Gas Purifying Catalyst by Impregnation Synthesis Method

In Example C, for the production of an exhaust gas purifying catalyst where a composite oxide of cobalt and an additive metal element is supported on a ceria-based support, the composite oxide was obtained by an impregnation synthesis method using any one of copper, silver, nickel, magnesium, zinc, iron and manganese as the additive metal element. Also, for comparison, cobalt oxide was obtained by an impregnation synthesis method using cobalt in place of the additive element, i.e., by using only cobalt as the raw material of the metal oxide.

That is, in Example C, as shown in Table 1 below, exhaust gas purifying catalysts having 8 kinds of catalyst configurations were obtained. Specifically, in Example C, the exhaust gas purifying catalyst was produced as follows.

1. Synthesis and Loading of Composite Oxide

In Example C, the same support powder as used in Example A was impregnated with a metal salt solution obtained as in Example A, dried at 120° C. and fired at 600° C. to obtain a catalyst powder.

2. Pelletization

The obtained catalyst powder was formed into a pellet shape in the same manner as in Example A to obtain the exhaust gas purifying catalyst of Example C.

<Evaluation Method>

Carbon Monoxide Purification Property

With respect to each of the exhaust gas purifying catalysts of Examples A to C, the temperature ($T_{50}$) at which the carbon monoxide conversion percentage is 50% was examined by gradually raising the temperature of evaluation gas to 600° C. under the following conditions.

Composition of Evaluation Gas:
CO: 0.65 mol %
$C_3H_6$: 0.05 mol % (1,500 ppmC)
$O_2$: 0.58 mol %
$N_2$: balance
Amount of catalyst used: about 0.75 g
Gas flow rate: 1 liter/min
Air-fuel ratio (A/F): 15.02
Spatial velocity (SV): 90,000 $h^{-1}$ <Summary 1 of Evaluation>

Summary of Evaluation Results Based on Type of Additive Metal Element

Figure 3:
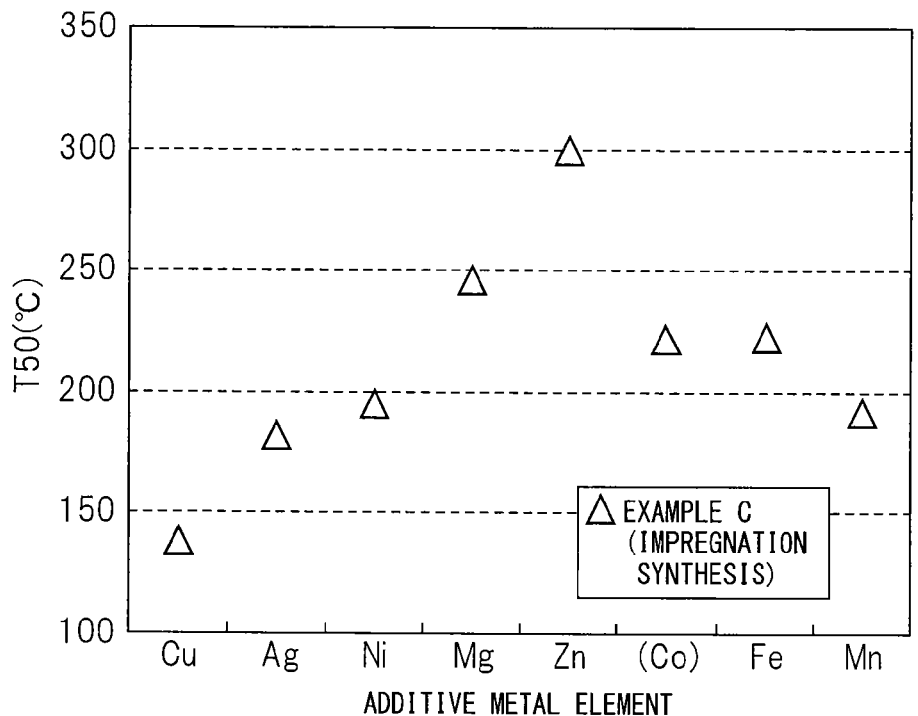
FIG. 3 is a graph showing the relationship between the type of additive metal element and the exhaust gas purification property, in regard to the exhaust gas purifying catalyst produced in Example C.

The evaluation results of carbon monoxide conversion property of the exhaust gas purifying catalysts obtained in Example A (citric acid-assisted synthesis method), Example B (coprecipitation synthesis method) and Example C (impregnation synthesis method) are shown in Table 1. Also, for clarification, the evaluation results for the exhaust gas purifying catalysts obtained in Examples A, B and C are shown in FIGS. 1 to 3, respectively.

TABLE 1

| | | $T_{50}$ (° C.) | | |
| --- | --- | --- | --- | --- |
| Additive Metal Element | Catalyst Configuration (catalyst component/support) | Example A (citric acid-assisted synthesis) | Example B (coprecipitation synthesis) | Example C (impregnation synthesis) |
| Cu | (Co—Cu composite oxide/Ce-based support) | 108.6 | 122.0 | 137.8 |
| Ag | (Co—Ag composite oxide/Ce-based support) | — | 169.8 | 181.7 |
| Ni | (Co—Ni composite oxide/Ce-based support) | 165.8 | 193.8 | 195.3 |
| Mg | (Co—Mg composite oxide/Ce-based support) | 176.8 | 188.3 | 245.7 |
| Zn | (Co—Zn composite oxide/Ce-based support) | 179.3 | 202.4 | 300.0 |
| (Co) | (Co oxide/Ce-based support) | 201.6 | 219.6 | 221.6 |
| Fe | (Co—Fe composite oxide/Ce-based support) | 202.8 | 218.7 | 222.5 |
| Mn | (Co—Mn composite oxide/Ce-based support) | 204.8 | 207.3 | 192.0 |

As understood from Table 1 and FIGS. 1 and 2, in the exhaust gas purifying catalysts produced by Example A (citric acid-assisted synthesis method) and Example B (coprecipitation method), i.e., in the exhaust gas purifying catalysts produced by the production methods wherein formation of a composite oxide of cobalt and additive element is promoted, the carbon monoxide conversion property was improved, when using, as the additive element, copper (Cu), silver (Ag), nickel (Ni), magnesium (Mg) and zinc (Zn).

Also, the exhaust gas purifying catalysts produced by Example A (citric acid-assisted synthesis method) had an excellent carbon monoxide conversion property, even compared with the exhaust gas purifying catalysts produced by Example B (coprecipitation synthesis method). This is considered to be attributable to the fact that formation of a solid solution of cobalt and the additive metal element was more successfully promoted in Example A (citric acid-assisted synthesis method) than in Example B (coprecipitation synthesis method).

However, even when the exhaust gas purifying catalysts are produced by Example A (citric acid-assisted synthesis method) and Example B (coprecipitation synthesis method), in the case of using iron and manganese as the additive element, the carbon monoxide conversion property was not improved. That is, a composite oxide of cobalt and iron, and a composite oxide of cobalt and manganese had only an exhaust gas purification property equal to that of cobalt oxide.

Incidentally, the exhaust gas purifying catalysts produced by Example C (impregnation synthesis method) exhibited a tendency different from the exhaust gas purifying catalysts produced by Example A (citric acid-assisted synthesis method) and Example B (coprecipitation method). This is considered to reveal that an appropriate composite oxide is less likely to be formed by the impregnation method.

Also in the evaluation of the hydrocarbon conversion percentage, the same tendency as in the carbon monoxide conversion property was observed.

<Summary 2 of Evaluation>

Summary of Evaluation Results Based on Size of Distortion of Crystal Structure

<Evaluation of Distortion of Crystal Structure>

Composite oxides obtained as in Example B (coprecipitation synthesis method) except for not using a support powder were analyzed by X-ray diffraction analysis. Based on the results of X-ray diffraction analysis, the $M_{TET}$-O bond distance and $M_{OCT}$-O bond distance in the spinel structure of the composite oxide were determined by Rietveld analysis.

Also, a composite oxide obtained as in Example A (citric acid-assisted synthesis method) except for not using a support powder was analyzed in the same manner. Regarding this, only copper was used as the additive metal element. That is, as for Example A, only a cobalt-copper composite oxide was evaluated.

In addition, a catalyst powder obtained as in Example C was evaluated in the same manner. Regarding this, only copper was used as the additive metal element. That is, as for Example C, only a cobalt-copper composite oxide was evaluated.

With respect to the exhaust gas purifying catalysts obtained by Example A (citric acid-assisted synthesis method), Example B (coprecipitation synthesis method) and Example C (impregnation synthesis method), the evaluation results of carbon monoxide (CO) conversion property are shown in Table 2 for the $M_{TET}$-O bond distance and $M_{OCT}$-O bond distance obtained above. Furthermore, for clarification, the evaluation results of the carbon monoxide conversion property are shown in FIG. 4 for the $M_{TET}$-O bond distance, and the evaluation results of the carbon monoxide conversion property are shown in FIG. 5 for the $M_{OCT}$-O bond distance.

TABLE 2

|  | Additive Metal Element | $M_{TET}$-O | $M_{OCT}$-O | $T_{50}$ (° C.) |
|---|---|---|---|---|
| Example B (coprecipitation synthesis) | (Co) | 1.90713 | 1.94254 | 219.6 |
|  | Fe | 1.88810 | 1.96106 | 218.7 |
|  | Mn | 1.89713 | 1.97713 | 207.3 |
|  | Ni | 1.91450 | 1.94010 | 193.8 |

TABLE 2-continued

|  | Additive Metal Element | $M_{TET}$-O | $M_{OCT}$-O | $T_{50}$ (° C.) |
|---|---|---|---|---|
|  | Mg | 1.93947 | 1.91850 | 188.3 |
|  | Ag | 1.92364 | 1.92576 | 169.8 |
|  | Cu | 1.94500 | 1.91500 | 122.0 |
| Example C (impregnation synthesis) | Cu | 1.93416 | 1.92000 | 137.8 |
| Example A (citric acid-assisted synthesis) | Cu | 1.95871 | 1.90967 | 108.6 |

As understood from Table 2, and FIGS. 4 and 5, the carbon monoxide conversion property of the spinel composite oxide containing cobalt (Co) had a clear correlation with the $M_{TET}$-O bond distance and $M_{OCT}$-O bond distance of the composite oxide. More specifically, compared with cobalt oxide not containing an additive metal element, when the $M_{TET}$-O bond distance in the spinel structure of the composite oxide was extended, and/or when the $M_{OCT}$-O bond distance in the spinel structure of the composite oxide was contracted, the spinel composite oxide had a better carbon monoxide conversion property.

Example D

In Example D, the effect of the type of the support supporting a composite oxide of cobalt and an additive metal element, on the property of the exhaust gas purifying catalyst was examined.

In Example D, a catalyst powder was obtained by loading a composite oxide of cobalt and copper on a support by the coprecipitation method in the same manner as in Example B except for using, as the support, any one of zirconia ($ZrO_2$) support particles, titania ($TiO_2$) support particles, alumina ($Al_2O_3$) support particles, and silica ($SiO_2$) support particles.

Also, the obtained catalyst powder was formed into a pellet shape in the same manner as in Example A to obtain the exhaust gas purifying catalyst of Example D.

The obtained exhaust gas purifying catalysts were evaluated for the carbon monoxide conversion property in the same manner as in Examples A to C. The evaluation results are shown in Table 3.

TABLE 3

| Catalyst Configuration (catalyst component/support) | $T_{50}$ (° C.) |
|---|---|
| Co—Cu composite oxide/$CeO_2$—$ZrO_2$ (Example B) | 122.0 |
| Co—Cu composite oxide/$ZrO_2$ | 151.3 |
| Co—Cu composite oxide/$TiO_2$ | 171.3 |
| Co—Cu composite oxide/$Al_2O_3$ | 232.0 |
| Co—Cu composite oxide/$SiO_2$ | 284.8 |
| Co—Cu composite oxide/$Al_2O_3$ (thermal endurance at 800° C.) | 380.5 |

As understood from Table 3, the carbon monoxide conversion property of the exhaust gas purifying catalyst greatly depends on the type of the support, and a good carbon monoxide conversion property was obtained only when a ceria-based support was used as the support.

This is considered to reveal that oxygen donation to carbon monoxide or the like from the composite oxide of cobalt and copper was promoted by the oxygen storage capacity (OSC capacity) of ceria. Also, the exhaust gas purifying catalyst (Co—Cu composite oxide/$Al_2O_3$) where a cobalt-copper composite oxide is supported on alumina was subjected to thermal endurance at 800° C., as a result, the exhaust gas purification property was greatly reduced. This suggests that the composite oxide has reactivity with alumina.

Examples E and F

In Examples E and F, the effect of the amount of copper on the property of the exhaust gas purifying catalyst was examined by changing the amount of copper, while keeping the amount of cobalt constant or not using cobalt.

Example E

In Examples E and F, the effect of the amount of copper on the property of the exhaust gas purifying catalyst was examined by changing the amount of copper, while keeping the amount of cobalt constant.

1. Preparation of Metal Salt Solution

Cobalt nitrate weighed such that the metal-based supporting amount of cobalt is 5 mass % relative to the support, and copper nitrate weighed such that the metal-based supporting amount of copper is 0.5 mass %, 1.0 mass %, 2.0 mass %, 2.75 mass %, 3.0 mass %, 4.0 mass % and 5.0 mass % relative to the support were dissolved in pure water, and the resulting solution was thoroughly stirred and mixed to obtain a metal salt solution.

Incidentally, when the metal-based supporting amount of cobalt was 5 mass % relative to the support, and the metal-based supporting amount of copper was 2.75 mass % relative to the support, the resulting molar ratio (Co:Cu) between cobalt and copper was about 2:1.

2. Preparation of Neutralizer Solution

An aqueous mixed solution containing 1 mol/L of sodium hydroxide (NaOH, produced by Aldrich) and pure water was thoroughly stirred and mixed to obtain a neutralizer solution.

3. Neutralization Reaction (Coprecipitation Reaction)

The metal salt solution and neutralizer solution obtained above were introduced each at a solution feed rate of 2.5 mL/min into a reaction vessel with a stirring device (SA reactor) and while keeping the temperature to a range from 0 to 50° C. The neutralization reaction was performed for about 1 hour to precipitate a precursor of a cobalt-copper composite oxide. Incidentally, during the neutralization reaction, the mixed aqueous solution was provided with a strong shear stress by super agitation at a rotation speed of 8,000 to 12,000 rpm.

4. Filtration and Washing

The obtained precursor was introduced into pure water and subjected to centrifugal separation, filtration and washing to obtain a slurry.

5. Loading, Drying and Firing

A ceria-zirconia composite oxide ($CeO_2$—$ZrO_2$) support powder (ACTALYSLISA, produced by CATALER Corporation) as a support was introduced into the obtained slurry, and subjected to evaporation to dryness, pulverization and then firing at 600° C. over 4 hours under atmosphere to obtain an exhaust gas purifying catalyst.

With respect to the obtained exhaust gas purifying catalyst, the dispersed state of supported catalyst was observed by a scanning transmission electron microscope (STEM), and the peak intensity was measured by X-ray diffraction (XRD) measurement. As a result, it was confirmed that the average particle diameter of cobalt oxide is about 40 nm, and copper oxide particles having an average particle diameter of about 10 nm were distributed in a highly dispersed state on the cobalt oxide particles.

Also, the STEM-EDX analysis confirmed that copper partially solid-dissolved in the cobalt oxide particles.

6. Pellet Molding

The obtained catalyst powder was formed into a pellet shape in the same manner as in Example A to obtain the exhaust gas purifying catalyst of Example D.

Example F

In Example F, the effect of the amount of copper on the property of the exhaust gas purifying catalyst was examined by changing the amount of copper without using cobalt.

An exhaust gas purifying catalyst was obtained in the same manner as in Example E except for using no cobalt nitrate and using copper nitrate weighed such that the metal-based supporting amount of copper is 1.0 mass %, 3.0 mass %, 5.0 mass % and 6.0 mass % relative to the support.

<Evaluation Method>

Carbon Monoxide Conversion Property

With respect to each of the exhaust gas purifying catalysts of Examples E and F, the temperature ($T_{50}$) at which the carbon monoxide conversion percentage is 50% was examined in the same manner as in Examples A to C. The evaluation results are shown in FIG. 6.

Figure 6:
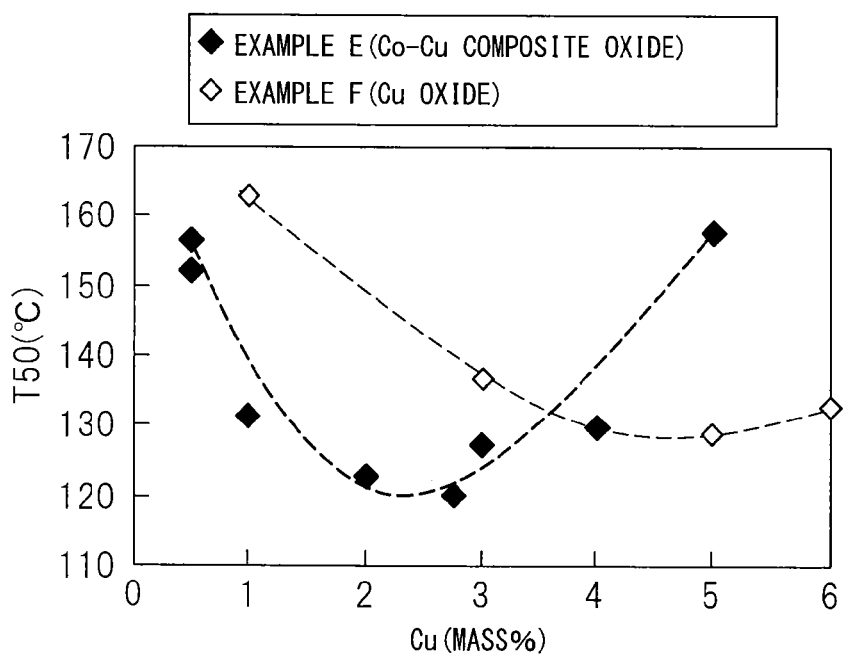
FIG. 6 is a graph showing the relationship between the composite oxide composition and the exhaust gas purification property, in regard to the exhaust gas purifying catalysts produced in Examples E and F.

It is understood from FIG. 6 that in the exhaust gas purifying catalyst using a cobalt-copper composite oxide, a good result is obtained particularly when the metal-based supporting amount of copper is from 2 to 3 mass %.

Comparative Example G

In Example G, the effect of the type of the additive metal element on the property of the exhaust gas purifying catalyst was examined by changing the type of the additive metal element used together with cobalt.

An exhaust gas purifying catalyst was obtained in the same manner as in Example E except for using any one of magnesium nitrate, manganese nitrate, iron nitrate, nickel nitrate, silver nitrate and cerium nitrate, in place of copper nitrate. Incidentally, in all catalysts, the molar ratio (Co:M) of cobalt (Co) and the additive metal element (M) such as magnesium was about 2:1. Also, an exhaust gas purifying catalysts were obtained in the same manner as in Example E except for using no copper nitrate, i.e., by using only cobalt as the raw material of the metal oxide.

<Evaluation Method 1>

Carbon Monoxide Conversion Property 1

Each of the exhaust gas purifying catalysts of Example G was examined for the carbon monoxide conversion percentage in the same manner as in Examples A to C. However, instead of the temperature ($T_{50}$) at which the carbon monoxide conversion percentage is 50%, the carbon monoxide conversion percentage at respective temperatures was examined. The evaluation results are shown in FIG. 7.

Figure 7:
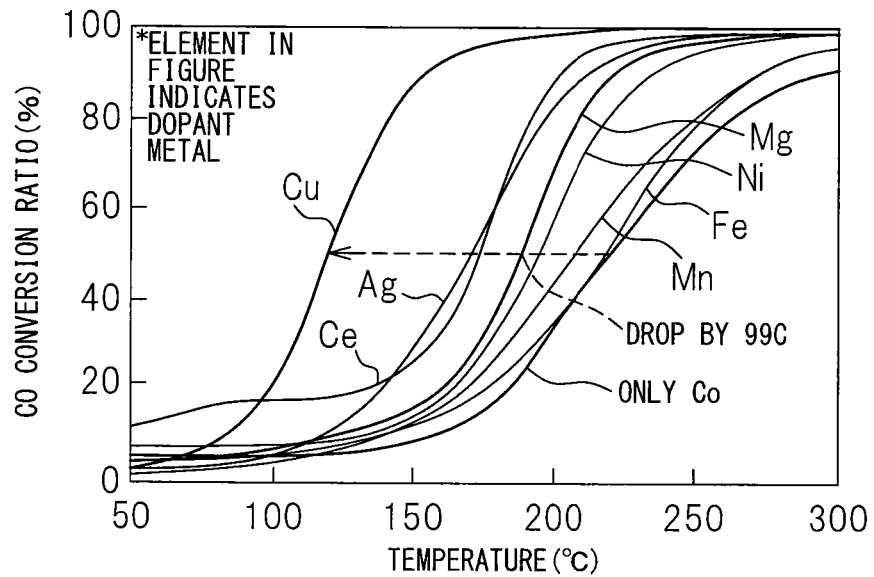
FIG. 7 is a graph showing the relationship between the type of additive element and the exhaust gas purification property, in regard to the exhaust gas purifying catalyst produced in Example G.

It is understood from FIG. 7 that when copper (Cu), silver (Ag), cerium (Ce), nickel (Ni) and magnesium (Mg) were used as the additive element, the carbon monoxide conversion percentage, and particularly the carbon monoxide conversion percentage at low temperature, was significantly improved.

<Evaluation Method 2>

Carbon Monoxide Conversion Property 2

Out of the exhaust gas purifying catalysts of Example G, with respect to the exhaust gas purifying catalysts using copper (Cu), nickel (Ni) and magnesium (Mg) as the additive metal element, and the exhaust gas purifying catalyst not using an additive metal element, the amount of carbon dioxide ($CO_2$) generated was evaluated by performing a temperature programmed reduction (CO-TPR) test of gradually raising the evaluation gas temperature to 600° C. under the following conditions.

Amount of catalyst used: about 0.3 g
Gas flow rate: 100 mL/min
Gas composition: CO: 1%, Air: 10%, He: 89%

Figure 8:
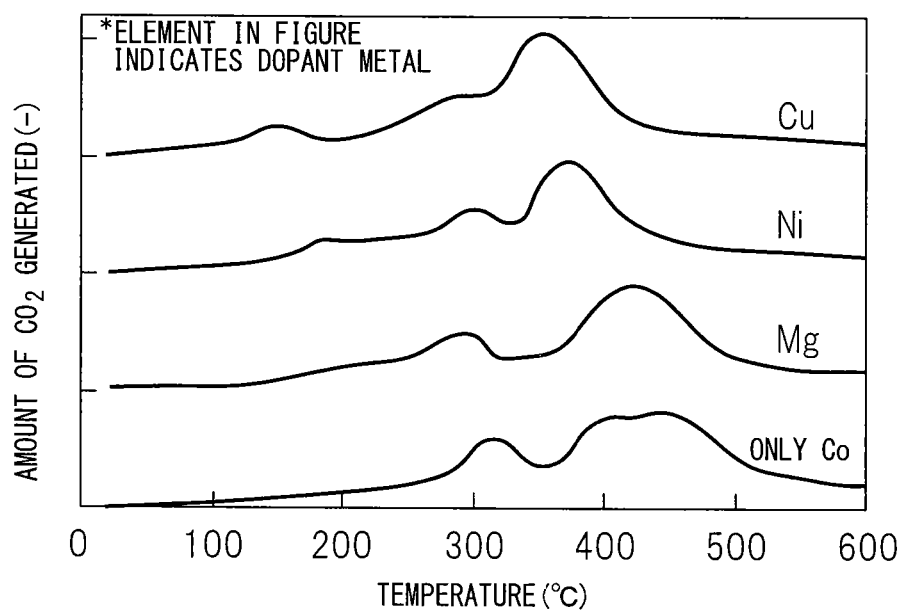
FIG. 8 is a graph showing the relationship between the type of additive element and the exhaust gas purification property, in regard to the exhaust gas purifying catalyst produced in Example G.

The evaluation results are shown in FIG. 8.

It is understood from the evaluation results that the temperature at which carbon monoxide (CO) is converted to carbon dioxide ($CO_2$) was lowered by using an additive element such as copper (Cu). This reveals that the cobalt-copper composite oxide and the like exhibit an activity of oxidizing carbon monoxide from a relatively low-temperature time.

The invention claimed is:

1. An exhaust gas purifying catalyst, comprising
   a ceria-based support, and
   a composite oxide of cobalt Co and an additive metal element M, supported on said ceria-based support,
   wherein said additive metal element comprises copper,
   wherein said composite oxide has a spinel structure, and
   wherein, when said composite oxide is analyzed by Rietveld analysis, compared with cobalt oxide not containing said additive metal element, the $M_{TET}$-O bond distance in the spinel structure of said composite oxide is extended by 0.03 Å or more, and/or the $M_{OCT}$-O bond distance in the spinel structure of said composite oxide is contracted by 0.03 Å or more.

2. The exhaust gas purifying catalyst according to claim 1, wherein said ceria-based support is selected from the group consisting of ceria particles, ceria-zirconia composite oxide particles, ceria-alumina composite oxide particles, ceria-titania composite oxide particles, ceria-silica composite oxide particles, and ceria-zirconia-alumina composite oxide particles.

3. The exhaust gas purifying catalyst according to claim 1, wherein a molar ratio of cobalt Co to said additive metal element M in said composite oxide is from 1:0.1 to 1:1.0.

4. The exhaust gas purifying catalyst according to claim 1, wherein a metal-based supporting amount of cobalt is from 1 to 20 mass % relative to said ceria-based support.

5. The exhaust gas purifying catalyst according to claim 1, wherein said composite oxide has a spinel structure, and
   wherein, when said composite oxide is analyzed by Rietveld analysis, compared with cobalt oxide not containing said additive metal element, the $M_{TET}$-O bond distance in the spinel structure of said composite oxide is extended by 0.03 Å or more.

6. The exhaust gas purifying catalyst according to claim 1, wherein said composite oxide has a spinel structure, and
   wherein, when said composite oxide is analyzed by Rietveld analysis, compared with cobalt oxide not containing said additive metal element, the $M_{OCT}$-O bond distance in the spinel structure of said composite oxide is contracted by 0.03 Å or more.

7. The exhaust gas purifying catalyst according to claim 1, wherein a cobalt-copper composite oxide is supported on said ceria-based support, and a metal-based supporting amount of copper is from 2 to 3 mass % relative to said ceria-based support.

8. The exhaust gas purifying catalyst according to claim 1, wherein a cobalt-copper composite oxide is supported on said ceria-based support, the cobalt-copper composite oxide comprises cobalt oxide particles having an average particle diameter of 20 to 100 nm, copper oxide particles having an average particle diameter of 2 to 10 nm are supported in a dispersed manner on said cobalt oxide particles, and copper at least partially solid-dissolved in said cobalt oxide particles.

9. A method for producing the exhaust gas purifying catalyst according to claim 1, the method comprising:
   providing a raw material solution containing a cobalt salt, a salt of said additive metal element, and a complexing agent, and
   impregnating said ceria-based support with said raw material solution, followed by drying and firing,
   wherein
   said complexing agent is an organic acid comprising at least one hydroxyl group and at least one carboxyl group.

10. The method according to claim 9, wherein said raw material solution further contains a polyhydric alcohol, and the method further comprises: after said impregnating but before said drying and firing, heating said raw material solution.

11. A method for producing the exhaust gas purifying catalyst according to claim 1, the method comprising:
    providing a raw material solution containing a cobalt salt and a salt of said additive metal element,
    adding a neutralizer to said raw material solution to precipitate a precursor of said composite oxide and to obtain a slurry of said precursor,
    impregnating said ceria-based support with said slurry, and
    drying and firing the ceria-based support impregnated with said slurry.

12. A method for producing the exhaust gas purifying catalyst according to claim 1, the method comprising:
    preparing a cobalt salt and a copper salt at such a ratio that a metal-based supporting amount of copper is 2 to 3 mass % relative to said ceria-based support,
    applying a shear stress by super agitation to a mixed solution of said cobalt salt, said copper salt and a neutralizer, to agitate the mixed solution and precipitate a cobalt-copper composite oxide precursor, and thus obtaining a slurry of said precursor,
    mixing said slurry and a ceria-based support powder to obtain a mixture, and
    separating a solid mixture of said precursor and said ceria-based support powder from the mixture, followed by drying and firing the mixture.

13. The production method according to claim 12, wherein said cobalt salt is used in such a ratio that a metal-based supporting amount of cobalt is 5 mass % relative to said ceria-based support.

14. The production method according to claim 12, wherein said neutralizer is an inorganic basic compound or an organic basic compound.

15. The production method according to claim 12, wherein said shear stress by super agitation is applied in a reaction vessel by an agitator rotating at a rotation speed of 5,000 to 15,000 rpm.

16. The production method according to claim 12, wherein said mixed solution is an aqueous solution.

* * * * *